(12) United States Patent
Millard et al.

(10) Patent No.: US 11,204,320 B2
(45) Date of Patent: Dec. 21, 2021

(54) AEROSOL TRANSMISSOMETER WITH AN IN-PROCESS TRANSFER STANDARD

(71) Applicant: RAYTHEON COMPANY, Waltham, MA (US)

(72) Inventors: John A. Millard, Sahuarita, AZ (US); John O. Crawford, Vail, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/856,370

(22) Filed: Apr. 23, 2020

(65) Prior Publication Data

US 2021/0333206 A1  Oct. 28, 2021

(51) Int. Cl.
*G01N 21/00* (2006.01)
*G01N 21/59* (2006.01)
*G02B 23/08* (2006.01)

(52) U.S. Cl.
CPC ............. *G01N 21/59* (2013.01); *G02B 23/08* (2013.01); *G01N 2201/12769* (2013.01)

(58) Field of Classification Search
CPC .. G01N 21/534; G01N 21/538; G01N 21/274; G01N 21/3504; G01N 21/59
USPC .... 356/432–440, 246; 250/573–575, 339.13, 250/565
See application file for complete search history.

(56) References Cited

U.S. PATENT DOCUMENTS

| | | | |
|---|---|---|---|
| 3,885,162 A * | 5/1975 | Geertz | G01N 21/534 250/573 |
| 3,931,526 A | 1/1976 | Berthon | |
| 3,986,023 A | 10/1976 | Frungel | |
| 4,010,357 A | 3/1977 | Horner | |
| 4,362,387 A | 12/1982 | Clark | |
| 4,396,286 A | 8/1983 | Shofner et al. | |
| 4,469,443 A | 9/1984 | Geller | |
| 4,480,191 A | 10/1984 | Karpowycz | |
| 5,028,790 A * | 7/1991 | McGowan | G01N 21/274 250/573 |

(Continued)

FOREIGN PATENT DOCUMENTS

| | | |
|---|---|---|
| CN | 107328715 A | 11/2017 |
| JP | 61137049 A | 6/1986 |
| KR | 101029775 B1 | 4/2011 |

OTHER PUBLICATIONS

International Search Report and Written Opinion for International Application No. PCT/US2021/019193; International Filing Date Feb. 23, 2021; dated May 27, 2021; 19 Pages.

*Primary Examiner* — Hoa Q Pham
(74) *Attorney, Agent, or Firm* — Cantor Colburn LLP

(57) ABSTRACT

A transmissometer and method for determining a transmissivity of an atmosphere within a chamber. A chamber contains the atmosphere. A light source generates a test beam and a light detector detects the test beam. A periscope is movable between a first position which allows the test beam to pass through the atmosphere in the chamber and into the light detector and a second position in which the test beam is deflected to pass into the light detector without passing through the atmosphere in the chamber. A processor determines the transmissivity of the atmosphere from a transmissivity measurement for the test beam obtained by the light detector when the periscope is in the first position and a transfer standard obtained at the light detector when the periscope is in the second position.

13 Claims, 3 Drawing Sheets

(56) References Cited

U.S. PATENT DOCUMENTS

| | | | | |
|---|---|---|---|---|
| 5,077,480 | A | * | 12/1991 | Traina .................. G01N 21/534 |
| | | | | 250/575 |
| 5,617,212 | A | * | 4/1997 | Stuart .................. G01N 21/534 |
| | | | | 356/435 |
| 5,625,189 | A | | 4/1997 | McCaul et al. |
| 5,771,484 | A | | 6/1998 | Tognazzini |
| 5,787,385 | A | | 7/1998 | Tognazzini |
| 5,977,546 | A | * | 11/1999 | Carlson ................ G01N 21/031 |
| | | | | 250/339.13 |
| 6,121,627 | A | * | 9/2000 | Tulip .................... G01N 21/39 |
| | | | | 250/559.4 |
| 6,396,056 | B1 | | 5/2002 | Lord et al. |
| 6,781,695 | B2 | * | 8/2004 | Hovan ................. G01N 21/538 |
| | | | | 250/339.13 |
| 7,068,362 | B2 | | 6/2006 | Murdock et al. |
| 7,122,820 | B2 | | 10/2006 | Engel et al. |
| 7,605,369 | B2 | | 10/2009 | Kerr |
| 9,007,591 | B2 | * | 4/2015 | Arimoto ............... G01J 3/0297 |
| | | | | 356/432 |
| 9,236,939 | B2 | | 1/2016 | Wayne et al. |
| 2008/0007728 | A1 | | 1/2008 | Schneider et al. |
| 2012/0200844 | A1 | | 8/2012 | Wallin et al. |
| 2014/0211209 | A1 | | 7/2014 | Ido et al. |

\* cited by examiner

AEROSOL TRANSMISSOMETER WITH AN IN-PROCESS TRANSFER STANDARD

GOVERNMENT LICENSE RIGHTS

This invention was made with Government support under N00019-04-C-0003 awarded by United States Department of Defense. The Government has certain rights in the invention.

BACKGROUND

The present disclosure relates to transmissometers and their methods of use and, in particular, to a system and method for calibrating a transmissometer.

A transmissometer is a device that is used to test the ability of a material to transmit (pass) electromagnetic energy (typically light at one or more wavelengths of interest). For transmission through a gaseous atmosphere, the transmissometer provides real-time measurement of the transmission with respect to various atmospheric conditions. A device under test is generally disposed external to the chamber or as an integral part of the chamber window and the atmosphere of the chamber is altered in order to simulate various atmospheric conditions, often by adjusting a level of humidity in the chamber, thereby achieving different levels of visibility at which to test the device. It is however useful to be able to calibrate the atmospheric condition within the chamber to a "clear" atmospheric condition or an atmosphere having a high level of visibility. Such calibration processes are usually performed only when the chamber has been sufficiently dehumidified, i.e., before or after the testing process. Such restrictions affect the quality of the calibration. Accordingly, there is a desire to be able to calibrate an atmosphere of a transmissometer chamber during a testing process.

SUMMARY

According to one embodiment of the present disclosure, a method for determining a transmissivity of an atmosphere within a chamber is disclosed. A transmissivity measurement is obtained at a light detector for a test beam that passes through the atmosphere in the chamber and into the light detector. A transfer standard is obtained at the light detector by deflecting the test beam so as to be received at the light detector without passing through the atmosphere in the chamber. The transmissivity of the atmosphere is determined from the transmissivity measurement and the transfer standard.

According to another embodiment of the present disclosure, a transmissometer for determining a transmissivity of an atmosphere is disclosed. The transmissometer includes a chamber for containing the atmosphere, a light source for generating a test beam, a light detector for detecting the test beam, a periscope movable between a first position which allows the test beam to pass through the atmosphere in the chamber and into the light detector and a second position in which the test beam is deflected to pass into the light detector without passing through the atmosphere in the chamber, and a processor configured to determine the transmissivity of the atmosphere from a transmissivity measurement for the test beam obtained by the light detector when the periscope is in the first position and a transfer standard obtained at the light detector when the periscope is in the second position.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
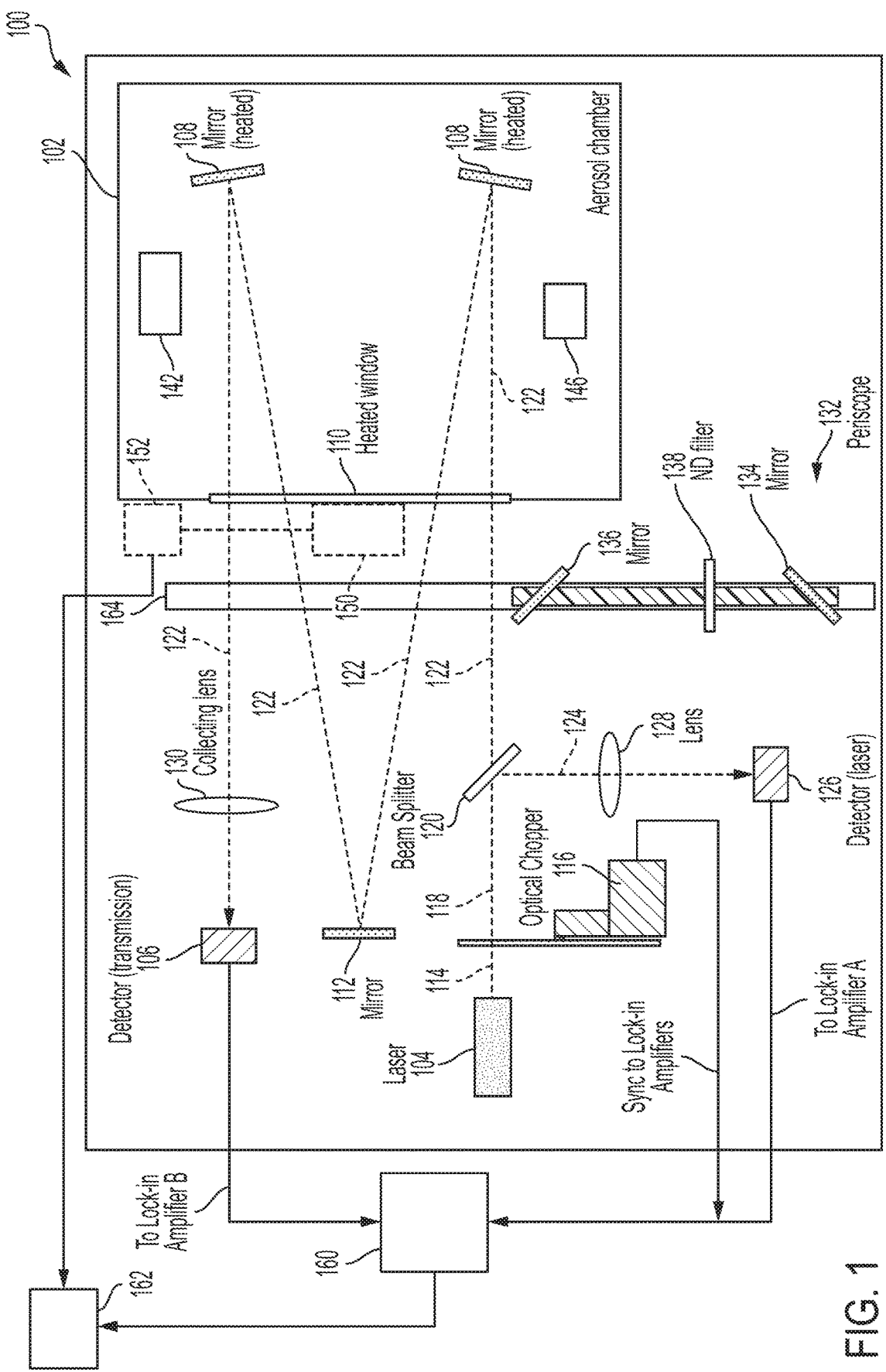
FIG. 1 shows a transmissometer in an illustrative embodiment with a periscope in a non-calibration position.

FIG. 1 shows a transmissometer 100 in an illustrative embodiment. The transmissometer 100 is used to test a device (e.g., sensors, detectors, etc.) in a plurality of atmospheric conditions. The transmissometer 100 includes an aerosol chamber 102. A device under test (DUT) 150 can be disposed to communicate directly with the atmosphere within the aerosol chamber 102 for testing and evaluation. During such tests, the atmosphere within the aerosol chamber 102 is adjusted to various levels of visibility and the DUT 150 is tested at these various levels. The DUT 150 is coupled to an oscilloscope 152 that obtains the output signals from the DUT 150 and generates various waveforms and/or measurements in response to the output signals. The waveforms and/or measurements can be sent to a computer or processor 162 which determines an evaluation of the DUT 150 at each of the visibility levels at which the measurements are obtained. Evaluation of the DUT 150 therefore includes having a knowledge of the visibility of the atmosphere within the aerosol chamber 102 at various times.

The transmissometer 100 also includes equipment for measuring the various parameters of the atmosphere contained by the aerosol chamber 102. In the illustrative embodiment of FIG. 1, the transmissometer 100 further includes a light source 104 for transmitting a test beam 122 and a light detector 106 for measuring a parameter of the test beam 122 once the test beam 122 has traversed a selected optical path. The parameter of the test beam 122 can be for example, an intensity, a magnitude, a frequency, a chopping frequency, etc. The transmissometer 100 can be configured to allow the optical path of the test beam 122 to pass through the aerosol chamber 102, as shown in FIG. 1. In this configuration, the parameter of the test beam 122 once it has passed through the aerosol chamber 102 is measured at the light detector 106 and compared to the parameter of the test beam 122 at the light source 104. This comparison determines a visibility of the test beam 122 through the atmosphere within the aerosol chamber 102, which thereby indicates a transmissivity of the atmosphere within the aerosol chamber 102, since transmissivity is directly related to visibility. The transmissivity of the atmosphere is affected by its various properties, including a water content or humidity of the atmosphere. A humidifier 142 is used to control a level of humidity within an aerosol chamber 102. The humidifier 142 can be either located within the aerosol chamber 102 or outside of the chamber (with humidified air from the humidifier 142 being piped into the aerosol chamber 102). A heater 146 is used to warm the mirrors 108 to prevent condensation on the mirrors 108.

The aerosol chamber 102 includes one or more chamber mirrors 108 therein and a window 110 to allow the test beam 122 to pass into and out of the aerosol chamber 102. In various embodiments, an outside mirror 112 is disposed outside of the aerosol chamber 102. The one or more chamber mirrors 108 and the outside mirror 112 are configured to reflect light from the light source 104 to the light detector 106 via a plurality of traversals of the aerosol chamber 102. As shown in FIG. 1, the test beam 122 passes through the aerosol chamber 102 a plurality of times before being incident on the light detector 106. Since condensation on the one or more chamber mirrors 108 and window 110 tends to absorb or deflect the test beam 122 from its intended path, the one or more chamber mirrors 108 and window 110 can be heated in order to prevent condensation from appearing on them. Although FIG. 1 shows a single outside mirror 112, in various embodiments, additional chamber mirrors and outside mirrors can be used to increase, via multiple reflections, the path of the light beam within the aerosol chamber 102.

In various embodiments, the light source 104 is a laser or other source of monochromatic light. The light source 104 generates a continuous light beam 114. The continuous light beam 114 is incident on an optical chopper 116 to create a chopped light beam 118. The chopped light beam 118 passes through a beam splitter 120 that splits the chopped light beam 118 into a test beam 122 and a calibration beam 124. The calibration beam 124 is directed into a calibration detector 126 that records one or more parameters of the light, such as intensity, magnitude, frequency, chopping frequency, etc. A lens 128 can be placed in an optical between the beam splitter 120 and the calibration detector 126 in order to focus the calibration beam 124 into the calibration detector 126. The one or more parameters measured at the calibration detector 126 represent an initial state of the light and can be compared to measurements obtained at the light detector 106 in order to calibrate these measurements.

The test beam 122 is directed through the aerosol chamber 102 to be reflected multiple times through the atmosphere of the aerosol chamber 102. As different levels of humidity are introduced into the aerosol chamber 102, the transmissivity of the atmosphere within the aerosol chamber 102 changes, thereby affecting the intensity of the test beam 122 received at the light detector 106. The light detector 106 is sensitive within a frequency range of the light source 104. A lens 130 can be placed in front of the light detector 106 in order to focus the test beam 122 at the light detector 106. The measurements obtained at the light detector 106 and the calibration measurements obtained at the calibration detector 126 are compared in order to detect the effects of humidity on the test beam 122, thereby quantifying humidity levels, transmissivity, visibility, etc.

Lock-in amplifier 160 can be used to make the measurements discussed herein, which can be supplied to the processer 162. The lock-in amplifier 160 can control operation of the light source 104 as well as the optical chopper 116. The lock-in amplifier 160 can also synchronize operation of the calibration detector 126, light detector 106 and optical chopper 116.

Referring still to FIG. 1, a periscope 132 is shown to a side of the transmissometer 100. The periscope 132 is a beam deflection device that is translatable into and out of the path of the test beam 122. The periscope 132 includes a first periscope mirror 134 and a second periscope mirror 136 spaced apart from the first periscope mirror 134 by a selected distance. A support or rail 140 holds the first periscope mirror 134 and the second periscope mirror 136 at a selected separation distance from each other. The periscope 132 can be moved into and out of the path of the test beam 122 along by moving the rail 140 along a track 164. A filter 138 such as a neutral density filter can be disposed between the first periscope mirror 134 and the second periscope mirror 136. The periscope 132 is shown to the side of the aerosol chamber 102 in FIG. 1 in a first position or non-calibration position. In the non-calibration position, the test beam 122 is allowed to pass through the aerosol chamber 102 to be detected at light detector 106.

Figure 2:
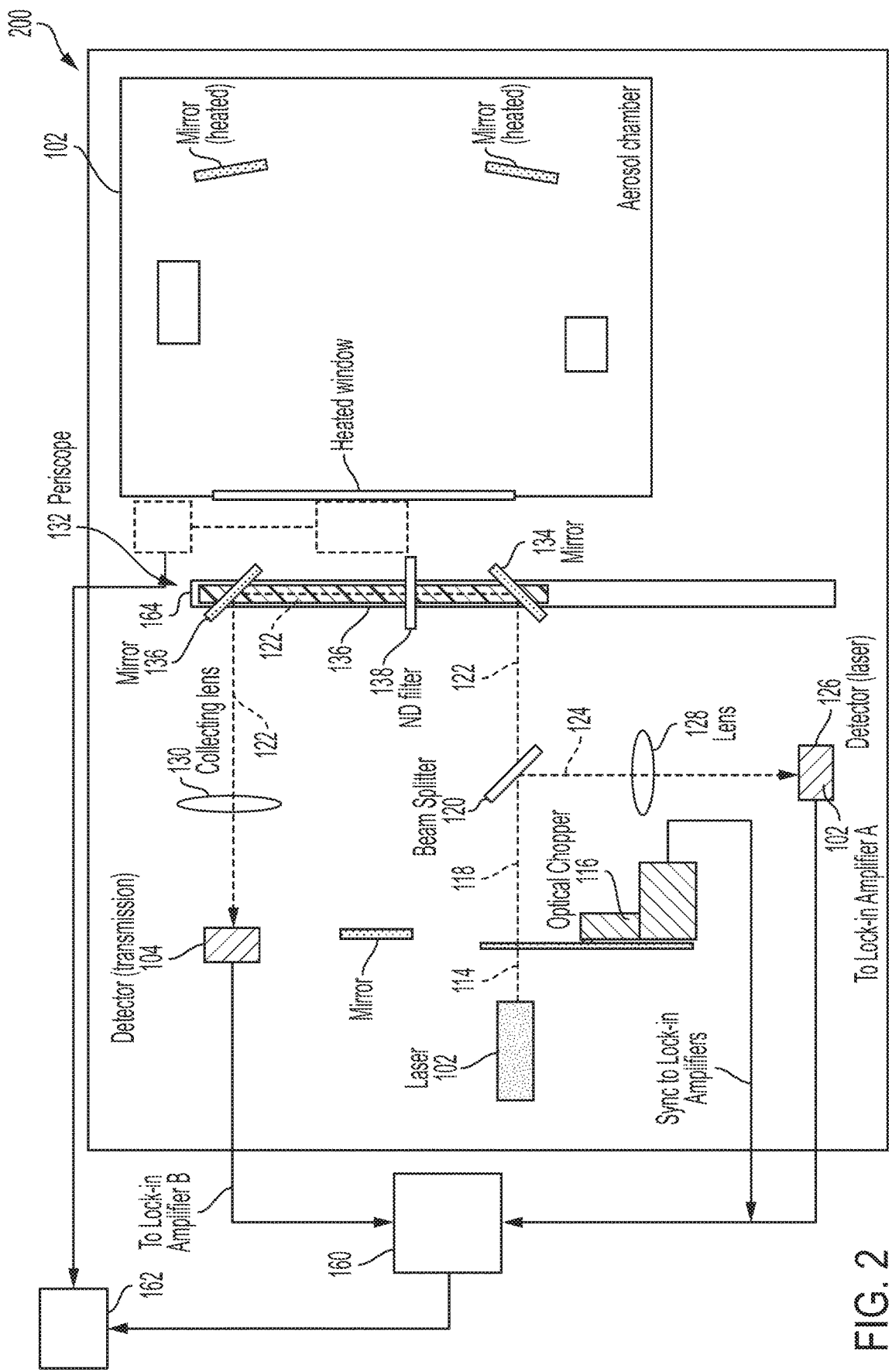
FIG. 2 shows the transmissometer of FIG. 1 with the periscope in a calibration position.

FIG. 2 shows the periscope 132 of FIG. 1 in a second position or calibration position. In the calibration position, the periscope 132 is disposed within the path of the test beam 122. The first periscope mirror 134 intercepts the test beam 122 and deflects the test beam 122 along the rail 140 to the second periscope mirror 136. The second periscope mirror 136 deflects the test beam 122 into the light detector 106. Thus, in the calibration position, the periscope redirects the test beam 122 from the light source 104 to the light detector 106 without the test beam 122 entering or passing through the aerosol chamber 102. The resulting calibration measurements obtained at the light detector 106 represent a high visibility atmosphere or "clear air" atmosphere which can be used to calibrate atmospheric measurements obtained as the test beam 122 passes through the aerosol chamber 102. Since the periscope 132 can be moved into and out of the path of the test beam 122, the calibration measurement can be obtained while the transmissivity testing is in progress. This reduces test times, since otherwise a lengthy process of dehumidification of the aerosol chamber 102 has to occur before a calibration measurement can be obtained. The use of the periscope 132 therefore enables rapid and accurate atmospheric calibration measurements.

The processer 162 processes data from the lock-in amplifier 160 as well as the waveforms and/or measurements from the oscilloscope 152 (as a function of time and/or transmission) and the calibration measurements to create data or a graph showing an operation of the DUT 150 at different levels of visibility.

Figure 3:
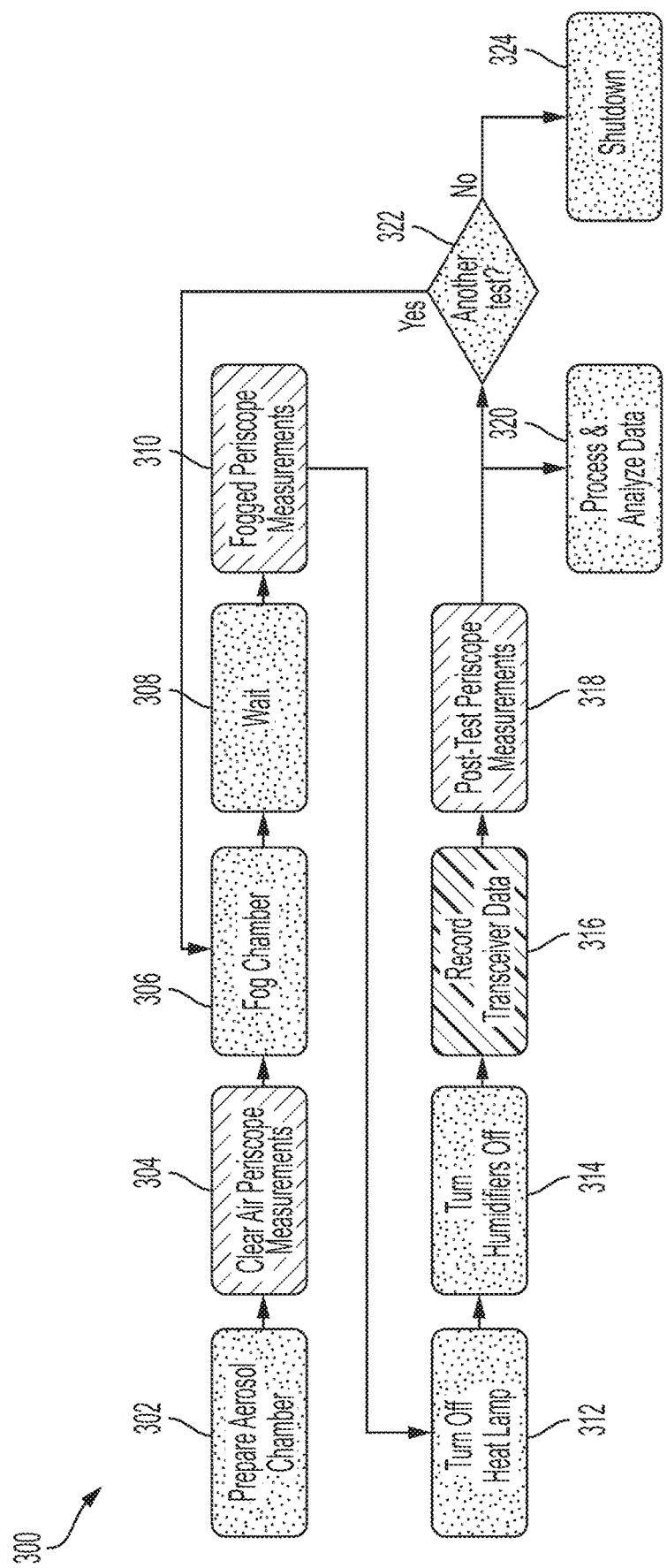
FIG. 3 show a flowchart illustrating a method of calibrating the transmissometer using the periscope.

FIG. 3 shows a flowchart illustrating a method of calibrating the transmissometer 100 using the periscope 132 of FIGS. 1 and 2. In box 302, the aerosol chamber 102 is prepared. Preparing the aerosol chamber 102 includes setting up the DUT 150 at the aerosol chamber window 110 for evaluation testing. In box 304, a clear air or pre-fog periscope measurement is obtained. The pre-fog periscope measurement includes taking a "clear air" measurement (i.e., with no humidity) through the chamber (i.e., with the periscope in its non-calibration position). The periscope 132 is then moved into the calibration position and a measurement, referred to herein as a "transfer standard" is obtained. The transfer standard can later be used to indicate a "clear air" condition in the aerosol chamber 102 during testing when the chamber is humidified. These two measurements are then used to calibrate the transmissivity measurements at any time during the testing process.

In box 306, the chamber is fogged or humidified by operating the humidifier 142 within the aerosol chamber 102. In box 308, a waiting period is passed in order to allow the humidifiers to bring the humidity to a selected level. The transmissometer 100 can be in the configuration of FIG. 1 in order to check the atmospheric condition within the aerosol chamber 102. In box 310, an in-test transfer standard measurement is obtained by moving the periscope 132 into the calibration configuration (FIG. 2) and obtaining a calibration measurement. In box 312, the heater 146 is turned off. In box 314, the humidifiers are turned off. In box 316, DUT test is performed with the periscope in the non-calibration position (FIG. 1). The DUT test includes testing the DUT 150 at various visibility levels. With the humidifier 142, and heater 146 turned off, the atmosphere slowly dehumidifies, thereby allowing the transmissivity level of the atmosphere to increase, as well as the visibility through the atmosphere. The test beam 122 passes through the atmosphere during this process in order to obtain transmissivity measurements, and therefore visibility measurements, for the various transmissivity levels for subsequent use in evaluating the DUT 150.

In box 318, a post-test calibration measurement is obtained by moving the periscope 132 into its calibration configuration (FIG. 2). Once the DUT test is completed, the method proceeds to box 320 and box 322. In box 320, the transmissivity data and DUT measurements are processed in order to evaluate the DUT 150. In box 322, a determination is made of whether another test is to be made of the DUT 150. If another test is to be made, then the method returns to box 306 and the aerosol chamber 102 is humidified again. If no other test is to be made, the method proceeds to box 324 at which time the method is ended and the transmissometer 100 is shut down.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for determining a transmissivity of an atmosphere within a chamber, comprising:

obtaining, at a light detector, a transmissivity measurement for a test beam that passes through the atmosphere in the chamber and into the light detector during a clear air condition in the chamber;

obtaining a clear air transfer standard at the light detector by deflecting the test beam to be received at the light detector without passing through the atmosphere in the chamber;

introducing a fog into the chamber;

obtaining an in-test transfer standard at the light detector by deflecting the test beam to be received at the light detector without passing through the atmosphere in the chamber; and determining the transmissivity of the atmosphere in the chamber in having the fog from the transmissivity measurement, clear air transfer standard and in-test transfer standard.

2. The method of claim 1, further comprising deflecting the test beam by disposing a periscope between a light source of the test beam and the chamber, wherein the periscope redirects the test beam from the light source to the light detector without the test beam entering the chamber.

3. The method of claim 2, wherein the periscope includes a rail translatable along a track, the rail supporting a first periscope mirror, a second periscope mirror and a neutral density filter between the first periscope mirror and the second periscope mirror.

4. The method of claim 3, further comprising moving the periscope from a first position out of a path of the test beam to a second position along the track to redirect the test beam.

5. The method of claim 1, further comprising obtaining the in-test transfer standard measurement while a device under test is in optical communication with the atmosphere of the chamber and determining an operation of the device under test based on the transmissivity.

6. The method of claim 1, wherein the clear air transfer standard represents a high visibility atmosphere.

7. A transmissometer for determining a transmissivity of an atmosphere, comprising:

a chamber for containing the atmosphere;

a light source for generating a test beam;

a light detector for detecting the test beam;

a periscope movable between a first position which allows the test beam to pass through the atmosphere in the chamber and into the light detector and a second position in which the test beam is deflected to pass into the light detector without passing through the atmosphere in the chamber; and a processor configured to determine the transmissivity of the atmosphere in the chamber during a fogged condition during a test, the transmissivity being determined from a transmissivity measurement for the test beam obtained by the light detector during a clear air condition in the chamber when the periscope is in the first position, a clear air transfer standard obtained at the light detector when the periscope is in the second position during the clear air condition and an in-test transfer standard obtained at the light detector by deflecting the test beam to be received at the light detector without passing through the atmosphere in the chamber during the fogged condition.

8. The transmissometer of claim 7, wherein, in the second position, the periscope is between the light source and the chamber.

9. The transmissometer of claim 7, wherein the periscope further comprises a rail translatable along a track, the rail supporting a first periscope mirror, a second periscope mirror and a neutral density filter between the first periscope mirror and the second periscope mirror.

10. The transmissometer of claim 7, further comprising a track for moving the periscope from the first position to the second position.

11. The transmissometer of claim 7 wherein the processor is further configured to evaluate a device under test being tested using the in-test transfer standard obtained during the testing of the device under test and determining an operation of the device under test based on the transmissivity, wherein the device under test is in optical communication with the atmosphere in the chamber.

12. The transmissometer of claim 7, wherein the clear air transfer standard represents a high visibility atmosphere.

13. The transmissometer of claim 7, further comprising a calibration detector for obtaining a calibration measurement of the test beam, wherein the processor determines a transmissivity of the atmosphere from the calibration measurement and the transmissivity measurement.

* * * * *